(No Model.)

J. A. SILBERMANN & J. G. RODRUAN.
SCOOP.

No. 335,390. Patented Feb. 2, 1886.

WITNESSES
Villette Anderson.

INVENTORS
John A. Silbermann
Jacob G. Rodruan
Anderson & Smith
their ATTORNEYS

N. PETERS, Photo-Lithographer, Washington, D. C.

UNITED STATES PATENT OFFICE.

JOHN ABRAHAM SILBERMANN AND JACOB G. RODRÜAN, OF FRACKVILLE, PENNSYLVANIA.

SCOOP.

SPECIFICATION forming part of Letters Patent No. 335,390, dated February 2, 1886.

Application filed October 24, 1884. Serial No. 146,416. (No model.)

*To all whom it may concern:*

Be it known that we, JOHN A. SILBERMANN and JACOB G. RODRÜAN, citizens of the United States, residing at Frackville, in the county of Schuylkill and State of Pennsylvania, have invented certain new and useful Improvements in Scoops; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
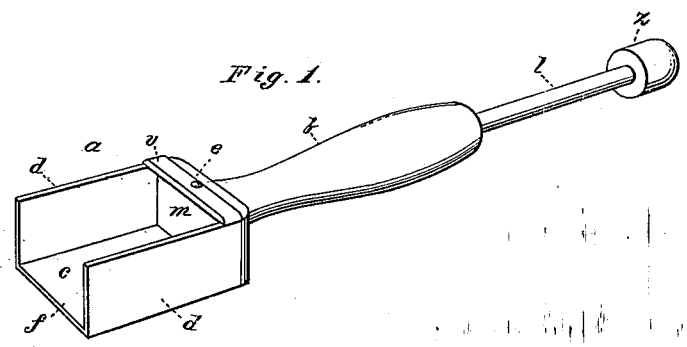
Figure 2:
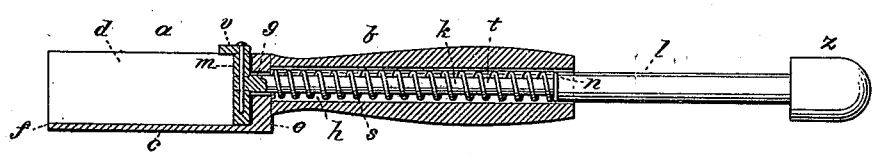

Figure 1 of the drawings is a representation of this invention, and is a perspective view. Fig. 2 is a sectional view.

This invention has relation to spoons or scoops for ice-cream, lard, and similar substances; and it consists in the construction and novel arrangement of devices, as hereinafter set forth, and pointed out in the appended claim.

In the accompanying drawings, the letter $a$ designates the body of the scoop, which is rectangular in transverse section, and is provided with the handle $b$, extending back parallel with the bottom $c$ of the scoop or bowl portion $a$. The side walls, $d$ $d$, are parallel. In the back wall, $e$, of the scoop is made a perforation, $g$, which communicates with an axial chamber, $h$, in the handle, which is somewhat larger in diameter than said perforation. A spiral spring, $s$, is seated in said chamber surrounding the narrow portion $k$ of the push-rod $l$, which extends through the perforation $g$, and is fastened to the discharge-plate $m$. This plate is of rectangular shape, conforming to that of the scoop $a$, and at its upper portion is provided with a transverse flange, $v$, which extends forward or parallel to the body, and is designed to assist in effecting the delivery of the mass contained in the scoop at the end thereof, preventing it from slipping over the upper edge of the plate into the chamber, which is left behind said plate as it is pushed forward in making the discharge. The push-rod $l$ is made with a shoulder at $n$ to engage the end of the spring. Outward from said shoulder this rod is of larger diameter that at $k$, being designed to fit the spring-chamber $h$ neatly. The length of this portion $t$ of the rod is a little greater than that of the scoop, so that when the push-plate is retracted to the back of the scoop the end of this enlarged portion of the rod will remain in the chamber.

$z$ is a knob on the end of the push-rod, upon which pressure is made in making the discharge. This knob also serves as a stop to prevent the plate $m$ from being pushed beyond the end or lip $f$ of the scoop.

Having described this invention, what we claim, and desire to secure by Letters Patent, is—

The rectangular scoop $a$, having the chambered handle $b$, the push-plate $m$, working in the scoop and having the transverse flange $v$, the spring $s$ in the chamber of the handle, and the push-rod $l$, shouldered at $n$, and having the enlargement longer than the scoop, and the knob-stop adapted to prevent the push-plate from leaving the lip of the scoop, substantially as specified.

In testimony whereof we affix our signatures in presence of two witnesses.

JOHN ABRAHAM SILBERMANN.
JACOB G. RODRÜAN.

Witnesses:
SAMUEL FRACK,
A. S. SEAMAN.